(12) United States Patent
Tokunaga et al.

(10) Patent No.: US 11,993,268 B2
(45) Date of Patent: May 28, 2024

(54) INFORMATION PROCESSING APPARATUS, MOVING BODY, COMPUTER-READABLE RECORDING MEDIUM AND METHOD

(71) Applicant: HONDA MOTOR CO., LTD., Tokyo (JP)

(72) Inventors: Kazunori Tokunaga, Tokyo (JP); Mafuyu Koseki, Tokyo (JP); Takashi Yamada, Tokyo (JP); Toshiaki Takano, Tokyo (JP); Satoshi Onodera, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 309 days.

(21) Appl. No.: 17/486,853

(22) Filed: Sep. 27, 2021

(65) Prior Publication Data

US 2022/0009504 A1    Jan. 13, 2022

Related U.S. Application Data

(63) Continuation of application No. PCT/JP2019/014387, filed on Mar. 29, 2019.

(51) Int. Cl.
*B60W 40/08* (2012.01)
*B60W 50/00* (2006.01)
(Continued)

(52) U.S. Cl.
CPC .......... *B60W 40/08* (2013.01); *B60W 50/082* (2013.01); *B60W 50/14* (2013.01);
(Continued)

(58) Field of Classification Search
CPC .... B60W 40/08; B60W 50/082; B60W 50/14; B60W 60/0059; B60W 2040/0809;
(Continued)

(56) References Cited

U.S. PATENT DOCUMENTS

2015/0112543 A1    4/2015  Binion
2017/0213458 A1*   7/2017  Gordon .................. E01F 13/04
(Continued)

FOREIGN PATENT DOCUMENTS

WO    2017111127 A1    6/2017
WO    2018100725 A1    6/2018

OTHER PUBLICATIONS (ISA/237) Written Opinion of the International Search Authority for International Patent Application No. PCT/JP2019/014387, mailed by the Japan Patent Office dated May 7, 2019.

*Primary Examiner* — Daryl C Pope

(57) ABSTRACT

In an information processing apparatus for managing or controlling a moving body used by a user based on a predetermined use condition, the moving body is configured to be switchable between an automatic driving mode and a manual driving mode, and the information processing apparatus comprises a use condition acquisition section for acquiring information related to the use condition of the moving body, a switch command acquisition section for acquiring a switch command for switching a driving mode of the moving body, and a switch judgment section for judging permission/prohibition of switching of the driving mode indicated by the switch command, based on the use condition of the moving body.

22 Claims, 7 Drawing Sheets

(51) Int. Cl.
 *B60W 50/08* (2020.01)
 *B60W 50/14* (2020.01)
 *B60W 60/00* (2020.01)
 *G06Q 40/08* (2012.01)
 *H04W 4/40* (2018.01)

(52) U.S. Cl.
 CPC ......... *B60W 60/0059* (2020.02); *G06Q 40/08* (2013.01); *H04W 4/40* (2018.02); *B60W 2040/0809* (2013.01); *B60W 2050/007* (2013.01); *B60W 2540/043* (2020.02); *B60W 2556/45* (2020.02)

(58) Field of Classification Search
 CPC ..... B60W 2050/007; B60W 2540/043; B60W 2556/45; G06Q 40/08; G06Q 30/06; G06Q 50/30; H04W 4/40; Y02T 10/72; Y02T 90/16; G08G 1/207; B60L 2240/70
 See application file for complete search history.

(56) References Cited

U.S. PATENT DOCUMENTS

2018/0057016 A1* 3/2018 Gordon ............... G05D 1/0061
2018/0301034 A1 10/2018 Morita
2019/0294163 A1 9/2019 Ueno
2020/0317216 A1* 10/2020 Konrardy ........... B60W 30/182

\* cited by examiner

INFORMATION PROCESSING APPARATUS, MOVING BODY, COMPUTER-READABLE RECORDING MEDIUM AND METHOD

The contents of the following international application are incorporated herein by reference:
NO. PCT/JP2019/014387 filed in WO on Mar. 29, 2019.

BACKGROUND

1. Technical Field

The present invention relates to an information processing apparatus, a moving body, a computer-readable recording medium and a method.

2. Related Art

A server apparatus for allotting a road region, in which a first vehicle should run by automatic driving, to said first vehicle, in order that a collision of the first vehicle running by automatic driving and a second vehicle running by manual driving should be prevented is known (for example, see Patent Document 1).

PRIOR ART

Patent Document

[Patent Document 1] PCT International Publication WO2017/111127 Pamphlet

DESCRIPTION OF EXEMPLARY EMBODIMENTS

Hereafter, the present invention is explained through the embodiments of the invention, however, the embodiments listed below do not limit the invention according to the claims. In addition, not all of the combination of the features explained in the embodiments are necessarily essential to the invention. Note that, in the figures, same referential numerals are assigned to the same or similar portions so as to omit overlapping explanation in some cases.

Summary of the Management System 100

Figure 1:
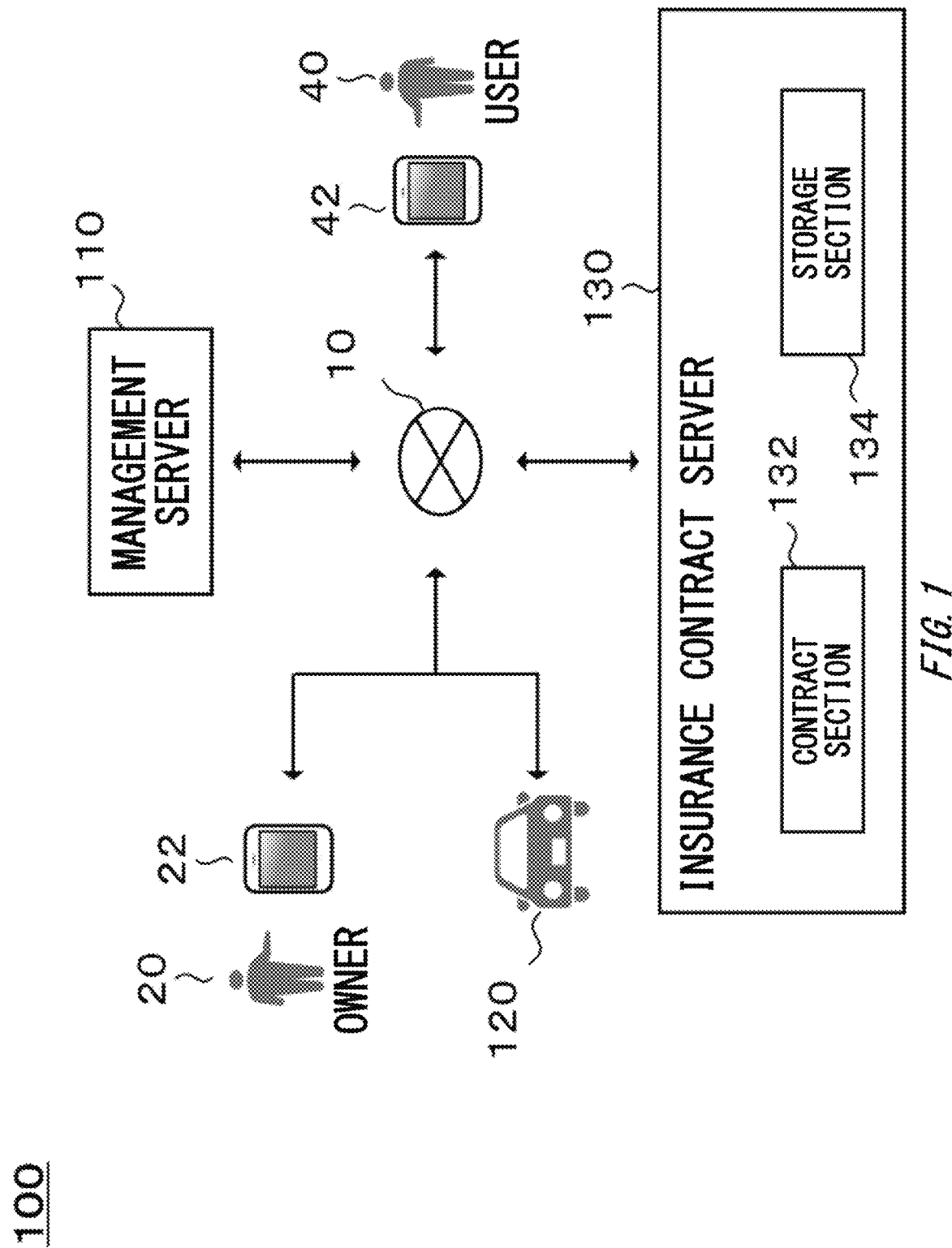
FIG. 1 schematically shows an example of a system configuration of a management system 100.

FIG. 1 schematically shows an example of a system configuration of a management system 100. As shown in FIG. 1, in this embodiment, the management system 100 includes a management server 110. The management system 100 may include one or multiple (abbreviated into "one or more" in some cases) vehicles 120. The management system 100 may include a communication terminal 22 to be utilized by an owner 20 of one or more vehicles 120. The management system 100 may include a communication terminal 42 to be utilized by a user 40 who temporarily uses the vehicle 120. The management system 100 may include an insurance contract server 130 for providing an insurance subscription service to at least one of the owner 20 and the user 40 of the vehicle 120. In this embodiment, the insurance contract server 130 may have a contract section 132 and a storage section 134. Each portion of the management system 100 may mutually send/receive information via a communication network 10.

Note that, the management system 100 may include one or more communication terminals 22 to be utilized by each of one or more owners 20. The management system 100 may include one or more communication terminals 42 to be utilized by each of one or more users 40. The management system 100 may include one or more insurance contract servers 130.

In this embodiment, the management system 100 manages one or more vehicles 120. The management system 100 may manage the navigation of each of one or more vehicles 120. The management system 100 may manage the position of each of one or more vehicles 120. The management system 100 may manage the status of each of one or more vehicles 120. The management system 100 may manage the schedule of each of one or more vehicles 120.

The schedule of the vehicle 120 is identified, for example, by information indicating a time point or the period, or information indicating the plan of the vehicle 120 in said time point or period. As the plan of the vehicle 120, (i) waiting in a given point or area, (ii) movement to a point specified by a vehicle arrangement request by the owner 20 or the user 40, (iii) use by the owner 20 or the user 40, and (iv) maintenance, etc., are exemplified.

In one embodiment, the management system 100 manages the vehicle arrangement plan of each of one or more vehicles 120. The vehicle arrangement plan may include information indicating the position of the next destination of each of one or more vehicles 120. The vehicle arrangement plan may include information indicating one or more plans related to the movement of each of one or more vehicles 120. Each of the information indicating one or more plans may include the information indicating the time point or the period at/in which the vehicle 120 is arranged, and the information indicating the position in which the vehicle 120 is arranged. Each of the information indicating one or more plans may include the duration period of said plan, the ending time point of said plan, or the information indicating the predicted values thereof. Each of the information indicating one or more plans may include the information indicating the position of the vehicle 120 at the ending time point of said plan.

In this embodiment, the management system 100 manages a contract related to each of one or more vehicles 120. As the contract related to the vehicle 120, a contract defining the conditions related to the use of the vehicle 120 by the user 40 (this is called "use contract" in some cases), a contract defining the conditions related to the insurance which the user 40 subscribes when using the vehicle 120 (this is called "insurance contract" in some cases), etc., are exemplified.

The use contract may be a contract between the administrator (not shown) of the management system 100 and the user 40, or may be a contract between the owner 20 and the user 40. The management system 100 may mediate establishment of a use contract. In one embodiment, the use contract is established, when the management system 100 accepts a request from the vehicle 120 desiring to use the vehicle 120 (this is called "vehicle arrangement request" in some cases). In another embodiment, the use contract is established when the management system 100 (i) processes said vehicle arrangement request to accordingly prepare a vehicle arrangement plan corresponding to said vehicle arrangement request, and (ii) obtains the assent by the user 40 corresponding to said vehicle arrangement plan.

The insurance contract may be a contract between an insurance company and the owner 20, or may be a contract between an insurance company and the user 40. The management system 100 may intermediate establishment of an insurance contract. The insurance contract may be established accompanied to the use contract. A single insurance contract may be established corresponding to a single use contract, or multiple insurance contract may be established corresponding to a single use contract. An insurance contract may be established in the middle of the contract period of a given use contract. The content of an insurance contract established at the time of establishing a given use contract may be altered during the contract period of said given use contract.

Summary of Each Portion of the Management System 100

In this embodiment, the communication network 10 transmits information between respective portions of the management system 100. The communication network 10 may be a transmission line of wired communication, may be a transmission line of wireless communication, or may be a combination of these. The communication network 10 may include a radio packet communication network, an Internet, a P2P network, a desiccated line, a VPN, a power line communication line or the like. The communication network 10 may: (i) include a mobile communication network such as a mobile phone line network; or (ii) include a wireless data communication network such as a wireless MAN (for example, WiMAX (registered trademark)), a wireless LAN (for example, WiFi (registered trademark)), a Bluetooth (registered trademark), a Zigbee (registered trademark), or an NFC (Near Field Communication)).

In this embodiment, the owner 20 transports, for example, a person or an article to a given point (this is called "destination" in some cases), using the vehicle 120. The owner 20 may use the vehicle 120 for transporting the owner 20 himself/herself, or may use the vehicle 120 for transporting a person other than the owner 20 (this is called "related person of the owner 20" in some cases) or an article. The article to be transported by the vehicle 120 may be a luggage of the owner 20, or may be a luggage of the related person of the owner 20.

The owner 20 may use the vehicle 120 to transport a person or an article to the destination, based on the contract. In this case, the owner 20 may drive the vehicle 120 by himself/herself, or may instruct a person who is under the direction of the owner 20 to drive the vehicle 120, or may entrust a third party to drive the vehicle 120.

The owner 20 may temporarily have the vehicle 120 used by another person. The owner 20 may have the vehicle 120 used by another person, based on the contract. For example, the owner 20 lends the vehicle 120 to another person. The owner 20 may have the vehicle 120 used by the user 40 who wishes to use the vehicle 120, through the intermediation by the management server 110.

The owner 20 may be a person who owns the vehicle 120, may be a person who is entitled to use the vehicle 120 to earn profit, or may be a person who is entitled to grant a license to use the vehicle 120 to another person. The owner 20 may be a person who uses the vehicle 120 based on a lease contract. The owner 20 may be an individual, may be a legal entity, or may be a group.

The owner 20 may, at least temporarily, use the vehicle 120 for the application of a taxi or a hired car. The owner 20 may, at least temporarily, use the vehicle 120 for the application of a car rental or a car sharing, or a ride sharing.

In this embodiment, the communication terminal 22 is, for example, the communication terminal utilized by the owner 20. The communication terminal 22 may be the communication terminal utilized by a person who uses the vehicle 120 on behalf of the owner 20. As the person who uses the vehicle 120 on behalf of the owner 20, a family member, a relative, an employee, a member, and a person who is entrusted any work to be conducted using the vehicle 120 (such person may be an individual, may be a legal entity, or may be a group), as well as a family member, a relative, an employee and a member of a party who is entrusted said work, etc., are exemplified.

In this embodiment, the communication terminal 22 sends and receives various kinds of information between respective portions of the management system 100, via the communication network 10. The communication terminal 22 may have an input device and an output device, to be utilized as the user interface of the management system 100.

The communication terminal 22 may suffice to be an information processing apparatus having a communication function, and its detail is not particularly limited. As the communication terminal 22, a personal computer, a mobile terminal and the like are exemplified. As the mobile terminal, a mobile phone, a smartphone, a PDA, a tablet, a notebook computer or a laptop computer, a wearable computer and the like are exemplified.

In this embodiment, the user 40 temporarily uses the vehicle 120. The user 40 may acquire the title to temporarily use the vehicle 120, based on the contract. The above-described contract may be intermediated by the management server 110. The user 40 may utilize the communication terminal 42 to acquire the information related to the above-described contract from the management server 110. The user 40 may be an individual, may be a legal entity, or may be a group.

In one embodiment, the user 40 uses the vehicle 120 to transport a person or an article to the destination, based on, for example, a transportation contract with the owner 20. In another embodiment, the user 40 uses the vehicle 120 to transport a person or an article to the destination, based on, for example, a rental contract with the owner 20. The person to be transported by the vehicle 120 may be the user 40, or may be a person other than the user 40 (this is called "related person of the user 40" in some cases). The article to be transported by the vehicle 120 may be luggage of the user 40, or may be luggage of a related person of the user 40.

The aspect of use of the vehicle 120 by the user 40 is not particularly limited. The aspect of use of the vehicle 120 defined by the above-described transportation contract or the rental contract may be an example of the aspect of use of the vehicle 120. The above-described transportation contract and the rental contract may be an example of the use contract of the vehicle 120.

In the use contract, the aspect of use of the vehicle 120 by the user 40 may be restricted. For example, if the vehicle 120 is configured to be switchable between the automatic driving mode and the manual driving mode, whether or not the user 40 is permitted to use the vehicle 120 in the manual driving mode may be defined in the use contract. The vehicle 120 may be configured to be switchable between the automatic driving mode and the manual driving mode, based on the command by the user 40. In one embodiment, the user 40 is not permitted to utilize the vehicle 120 in the manual driving mode at all. In another embodiment, the user 40 is permitted to freely utilize the vehicle 120 in the manual driving mode.

Further in another embodiment, the user 40 is permitted to utilize the vehicle 120 in the manual driving mode, when the predefined condition is established. As the above-described predefined condition, (i) a condition that the vehicle 120 exists in a given area or pathway, (ii) a condition that the attribute of the area or pathway in which the vehicle 120 exists matches with a given condition, (iii) a condition that the current time point pertains to a given time zone, (iv) a condition that the weather condition of the current position of the vehicle 120 matches with a given condition, and (v) a condition that the status of the user 40 matches with a given condition, etc., are exemplified.

As the above-described status of the user 40, a health status of the user 40, a physical status of the user 40, a mental status or psychological status of the user 40, a wakefulness status of the user 40, a fatigue status of the user 40 and the like are exemplified. As other examples of the above-described status of the user 40, presence/absence of a fellow passenger, a driving history or driving experience of the user 40, the driving skill of the user 40, the length of the driving time in the use period of this time, the frequency of taking a rest in the use period of this time, the driving history in the past, the use performance in the past, the assessment at the time when the vehicle 120 was used in the past, etc., are exemplified.

The above-described given condition may be defined by the setting of the management server 110, may be defined by each owner 20 of one or more vehicles 120, or may be defined based on the attribute of the user 40. As the attribute of the user 40, presence/absence of a fellow passenger, the driving history or driving experience, the driving skill, the driving history in the past, the use performance in the past, the assessment at the time when the vehicle 120 was used in the past, etc., are exemplified.

In this embodiment, the communication terminal 42 is, for example, the communication terminal used by the user 40. The communication terminal 42 may be the communication terminal utilized by a person who uses the vehicle 120 on behalf of the user 40. As the person who uses the vehicle 120 on behalf of the user 40, a family member, a relative, an employee, a member, and a person who is entrusted any work to be conducted using the vehicle 120 (such person may be an individual, may be a legal entity, or may be a group), as well as a family member, a relative, an employee and a member of a party who is entrusted said work, etc., are exemplified.

In this embodiment, the communication terminal 42 sends and receives various kinds of information between respective portions of the management system 100, via the communication network 10. The communication terminal 42 may have an input device and an output device, to be utilized as the user interface of the management system 100.

The communication terminal 42 may suffice to be an information processing apparatus having a communication function, and its detail is not particularly limited. As the communication terminal 42, a personal computer, a mobile terminal and the like are exemplified. As the mobile terminal, a mobile phone, a smartphone, a PDA, a tablet, a notebook computer or a laptop computer, a wearable computer and the like are exemplified.

In this embodiment, the management server 110 manages one or more vehicles 120. The management server 110 may manage the navigation of each of one or more vehicles 120. The management system 100 may manage the position of each of one or more vehicles 120. The management system 100 may manage the status of each of one or more vehicles 120. The management server 110 may manage the schedule of each of one or more vehicles 120. The management server 110 may manage the vehicle arrangement of each of one or more vehicles 120.

In this embodiment, the management server 110 may manage a contract related to at least one of the one or more vehicles 120. The management server 110 may manage a use contract related to at least one of the one or more vehicles 120. The management server 110 may manage an insurance contract related to at least one of the one or more vehicles 120.

In one embodiment, the management server 110 may manage the fulfillment of the use contract. The management server 110 may manage the fulfillment of a given use contract, by means of controlling actions of the vehicle 120 to be used based on said given use contract. In another embodiment, the management server 110 may alter the content of the use contract of the user 40, in response to the request from the user 40 who is using the vehicle 120. The management server 110 may alter the content of the insurance contract corresponding to the use contract, along with the alteration of the content of said use contract.

In this embodiment, the vehicle 120 is used, for example, by the user 40 for transporting a person or an article. The vehicle 120 may be used for transporting the user 40 or a related person of the user 40, or may be used for transporting a luggage of the user 40 or a related person of the user 40. Note that, the owner 20 as the user 40 uses the vehicle 120 in some cases.

In one embodiment, the vehicle 120 is used by the user 40, for example, based on the contract between the owner 20 and the user 40. In another embodiment, the vehicle 120 is used by the user 40, for example, based on the contract between the administrator of the management server 110 and the user 40.

For example, the vehicle 120 transports a person or an article, starting from the point according to the desire by the user 40 to the point according to the desire by the user 40. The vehicle 120 may return to the start point after transporting a person or an article to the point according to the desire by the user 40, or may move to another point which is different from the start point. The vehicle 120 may, pursuant to the command from the management server 110 (this is called "vehicle arrangement command" in some cases), move to the point specified by said vehicle arrangement command.

The vehicle 120 may be an unmanned driving vehicle, an automatic driving vehicle or a remote driving vehicle, or may be a manned driving vehicle. The vehicle 120 may have a manual driving mode and an automatic driving mode. The vehicle 120 may be configured to be switchable between the manual driving mode and the automatic driving mode. The switching style of the driving mode of the vehicle 120 is not particularly limited.

In one embodiment, the vehicle 120 is configured to be switchable between the manual driving mode and the automatic driving mode, based on the command by the user 40. For example, a control apparatus mounted to the vehicle 120 (this is called "ECU" in some cases) outputs a signal for switching the driving mode of the vehicle 120 (this is called "switch command" in some cases), based on the input by the user 40.

In another embodiment, the vehicle 120 is configured to be switchable between the manual driving mode and the automatic driving mode, by means of the automatic control of the control apparatus mounted to the vehicle 120. For example, the control apparatus for automatic driving mounted to the vehicle 120 (this is called "AD-ECU" in some cases) outputs a switch command, according to at least one of the state of the vehicle 120 and the user 40.

Further in another embodiment, the vehicle 120 is configured to be switchable between the manual driving mode and the automatic driving mode, by means of remote operation. For example, the ECU mounted to the vehicle 120 receives a command from the external control apparatus or the user 40, via the communication network 10, and outputs the switch command based on said command.

As the vehicle 120, a bicycle, an automobile, a motorcycle, a train and the like are exemplified. As the automobile, an engine vehicle, an electric vehicle, a fuel cell vehicle, a hybrid vehicle, a work machine and the like are exemplified. As the motorcycle, (i) a motorbike, (ii) a three-wheeled motorcycle, and (iii) a standing ride bicycle or tricycle equipped with a power unit, and the like, are exemplified.

In this embodiment, the insurance contract server 130 may be a communication terminal utilized by an insurance agent who provides an insurance service or an intermediary agent who intermediates an insurance service. The contract section 132 assists at least one of the owner 20 and the user 40 of the vehicle 120 to take a procedure for subscribing an insurance service. When at least one of the owner 20 and the user 40 of the vehicle 120 subscribes an insurance service, an insurance contract related to the vehicle 120 is established. The storage section 134 stores information indicating the content of each of one or more insurance contracts (this is called "insurance information" in some cases). The storage section 134 may, from among the stored information, extract the information matching with the request, in response to said request from the external information processing apparatus. Moreover, the storage section 134 may send the extracted information to the information processing apparatus which sent the above-described request.

In this embodiment, the insurance contract server 130 suffices to be an information processing apparatus that can send and receive various kinds of information between the management system 100 and each portion via the communication network 10, and its detail is not particularly limited. As the insurance contract server 130, a personal computer, a mobile terminal and the like are exemplified. As the mobile terminal, a mobile phone, a smartphone, a PDA, a tablet, a notebook computer or a laptop computer, a wearable computer and the like are exemplified.

Specific Configuration of Each Portion of the Management System 100

Each portion of the management system 100 may be realized by hardware, may be realized by software, or may be realized by hardware and software. At least a part of each portion of the management system 100 may be realized by a single server, or may be realized by multiple servers. At least a part of each portion of the management system 100 may be realized on a virtual server or on a cloud system. At least a part of each portion of the management system 100 may be realized by a personal computer or by a mobile terminal. As the mobile terminal, a mobile phone, a smartphone, a PDA, a tablet, a notebook computer or a laptop computer, a wearable computer and the like can be exemplified. Each portion of the management system 100 may store information by utilizing a distributed ledger technology such as a block chain or a distributed network.

If at least a part of components constituting the management system 100 is realized by software, the component realized by said software may be realized by activating a program which defines the action related to said component in an information processing apparatus with a general configuration. The above-described information processing apparatus with a general configuration may include (i) a data processing apparatus having a processor such as a CPU or a GPU, a ROM, a RAM, a communication interface and the like, (ii) an input apparatus such as a keyboard, a pointing device, a touch panel, a camera, a voice/sound input apparatus, a gesture input apparatus, various kinds of sensors, a GPS receiver, and (iii) an output apparatus such as a display apparatus, a voice/sound output apparatus, a vibration apparatus, and (iv) a storage apparatus (including an external storage apparatus) such as a memory, an HDD, an SSD and the like.

In the above-described information processing apparatus with a general configuration, the above-described data processing apparatus or storage apparatus may store the above-described program. The above-described program is executed by a processor to thereby cause the above-described information processing apparatus to execute actions defined by said program. The above-described program may be stored in a non-transitory computer-readable recording medium. The above-described program may be stored in a computer-readable medium such as a CD-ROM, a DVD-ROM, a memory, a hard disk, etc., or may be stored in a storage apparatus connected to a network.

The above-described program may be a program for causing the computer to function as the management system 100 or as a part of thereof. The above-described program may include a module defining the action of each portion of the management system 100. The program or the module works on a data processing apparatus, an input apparatus, an output apparatus, a storage apparatus and the like to cause the computer to function as each portion of the management system 100 or to cause the computer to execute an information processing method in respective portions of the management system 100.

The above-described program may be installed to the computer which constitutes at least a part of the management system 100, from a computer-readable medium or a storage apparatus connected to a network. The computer may function as at least a part of each portion of the management system 100, as a result that the above-described program is executed. The information processing described in the above-described program functions as a concrete means in which the software related to said program and the management system 100 or various kinds of hardware resources being a part thereof cooperate, as a result that said program is read by the computer. Thereafter, the management system 100 according to the above-described purpose of use is built, as a result that the above-described concrete means realizes computation or processing of information according to the purpose of use of the computer in this embodiment.

The above-described program may be a program for causing the computer to function as the management server 110. The above-described program may be a program for causing the computer to execute the information processing method in the management server 110. The above-described program may be a program for causing the computer to function as the control apparatus of the vehicle 120. The above-described program may be a program for causing the computer to execute the information processing method in the control apparatus of the vehicle 120.

The above-described information processing method may be a method for managing or controlling the moving body used by the user based on the use condition. The moving body may be configured to be switchable between the automatic driving mode and the manual driving mode. The moving body may be configured to be switchable between the automatic driving mode and the manual driving mode, based on the command by the user. The use condition is included, for example, in the use contract.

The above-described method may have a use condition acquisition step for acquiring information related to the use condition of the moving body. The above-described method may have a switch command acquisition step for acquiring switch command for switching the driving mode of the moving body. The above-described method may have a switch judgment step for judging permission/prohibition of switching the driving mode indicated by the switch command, based on the use condition of the moving body. Each step of the above-described method may be executed by the computer.

The management system 100 may be an example of the information processing apparatus. The management server 110 may be an example of the information processing apparatus. The vehicle 120 may be an example of the moving body. The user 40 may be an example of the user.

Note that, in this embodiment, an example of the management system 100 is explained, taking a case where the management server 110 executes information processing for managing or controlling the vehicle 120 as an example. In this embodiment, the management server 110 manages or controls the vehicle 120, via the communication network 10 including the wireless communication network. However, the management system 100 is not limited to this embodiment. In another embodiment, the information processing apparatus mounted to the vehicle 120 may execute at least a part of information processing in the management server 110 according to this embodiment. In this case, the information processing apparatus mounted to the vehicle 120 may be an example of the information processing apparatus.

Moreover, in this embodiment, an example of the management system 100 is explained, taking a case where the vehicle 120 is used by the user 40 as an example. However, the management system 100 is not limited to this embodiment. In another embodiment, any moving body may be used by the user 40.

As the moving body, a vehicle, a marine vessel, a flying object and the like are exemplified. As the vehicle, a bicycle, an automobile, a motorcycle, a train and the like are exemplified. As the marine vessel, a ship, a hovercraft, a water bike, a submarine, a submersible craft, an underwater scooter and the like are exemplified. As the flying object, an air plane, an air ship or a balloon, a hot-air balloon, a helicopter, a drone and the like are exemplified.

Figure 2:
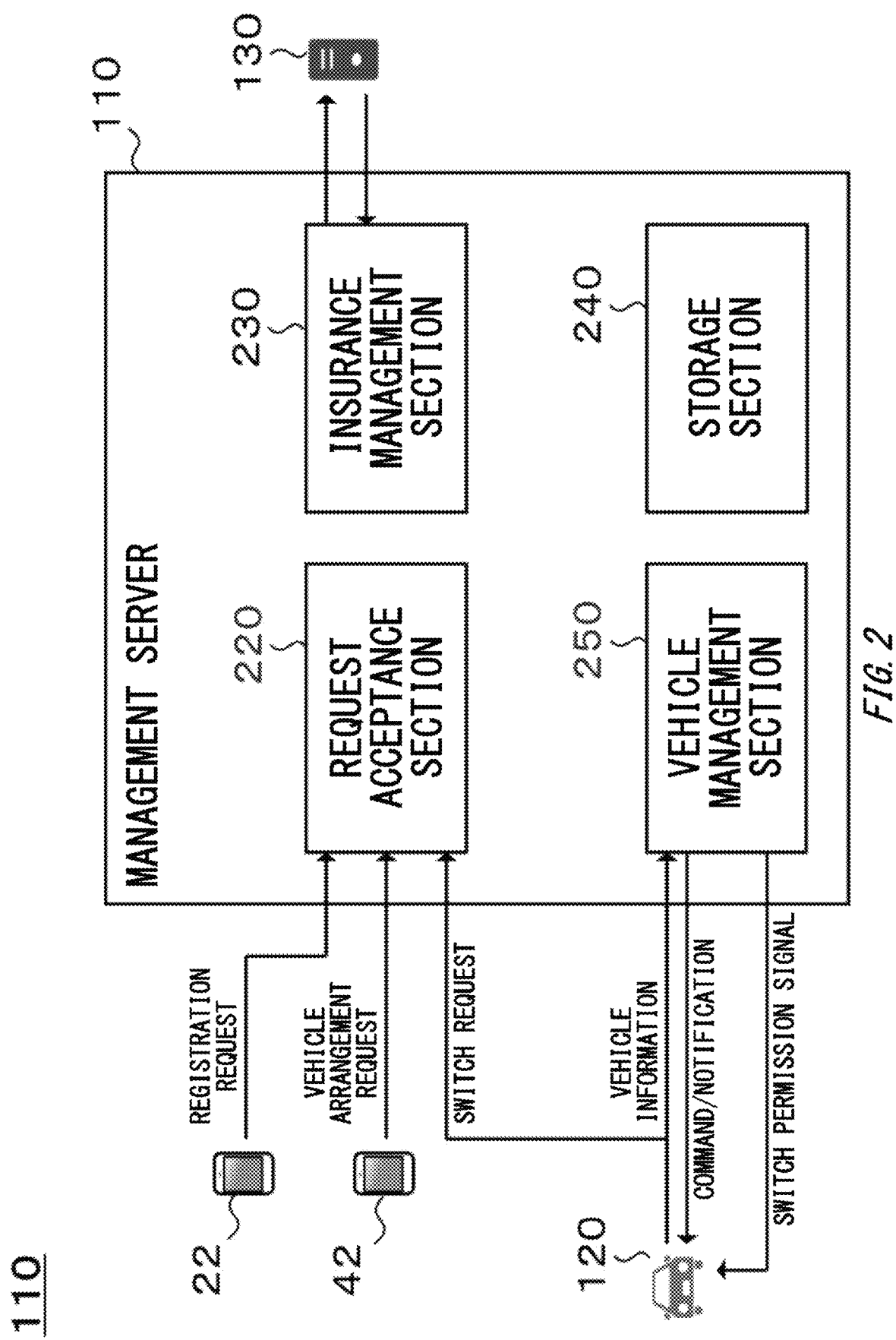
FIG. 2 schematically shows an example of a system configuration of a management server 110.

FIG. 2 schematically shows an example of a system configuration of a management server 110. In this embodiment, the management server 110 includes, for example, a request acceptance section 220, an insurance management section 230, a storage section 240 and a vehicle management section 250.

In this embodiment, the request acceptance section 220 accepts various kinds of requests from at least one of the owner 20 and the user 40. In one embodiment, the request acceptance section 220 accepts a vehicle registration request from the owner 20. In another embodiment, the request acceptance section 220 accepts a vehicle arrangement request from the user 40. By this, the request acceptance section 220 can acquire information indicating at least a part of the content of the use contract of the vehicle 120. Moreover, the request acceptance section 220 can acquire information indicating the attribute of the user 40 (this is called "attribute information" in some cases). As the attribute information that can be acquired from the vehicle arrangement request, presence/absence of a fellow passenger, a getting-on position, a getting-on time point and the like are exemplified.

In this embodiment, the request acceptance section 220 accepts an attribute registration request from at least one of the owner 20 and the user 40. For example, the request acceptance section 220 accepts an attribute registration request from the user 40. The attribute registration request may, for example, be information indicating that the user 40 requests registration of the personal information or the profile information of the user 40 against the management server 110. As the personal information or the profile information of the user 40, a name, an address, a date of birth, an age, a hobby, a driving history, a driving experience, a category of the driver's license which he/she possesses, information indicating his/her driving skill and the like are exemplified. The request acceptance section 220 may store the acquired attribute information in the storage section 240.

In this embodiment, the insurance management section 230 manages a contract related to one or more vehicles 120. For example, the management server 110 manages the information indicating the content of the use contract related to at least one of the one or more vehicles 120 (this is called "use contract information" in some cases). The management server 110 may manage the information indicating the content of the insurance contract related to at least one of the one or more vehicles 120 (this is called "insurance contract information" in some cases).

For example, the insurance management section 230 acquires the use contract information of the use contract related to the vehicle 120 under management by the management server 110 from the request acceptance section 220 or the vehicle management section 250. The insurance management section 230 stores the use contract information, for example, in the storage section 240. The insurance management section 230 acquires the insurance contract information of the insurance contract related to the vehicle 120 under management by the management server 110 from the insurance contract server 130. The insurance management section 230 stores the insurance contract information, for example, in the storage section 240. The insurance management section 230 may store the information related to the insurance contract in the storage section 240 in association with the information related to the use contract that relates to the insurance contract.

In this embodiment, the storage section 240 stores various kinds of information. The storage section 240 may store information to be used in information processing by the management server 110. The storage section 240 may store the information generated in course of information processing by the management server 110. The detail of the storage section 240 will be described later.

In this embodiment, the vehicle management section 250 manages one or more vehicles 120. The vehicle management section 250 acquires a vehicle arrangement request from the user 40 to allot a given vehicle 120 against said vehicle arrangement request. By this, a use contract for the above-described given vehicle 120 is established.

The vehicle management section 250 manages the navigation of the vehicle 120 in order that the vehicle 120 should arrive at the position indicated by said vehicle arrangement request by the time point indicated by the above-described vehicle arrangement request. Moreover, the vehicle management section 250 may output the use contract information of the above-described use contract to the insurance management section 230. The vehicle management section 250 may output the use contract information of one or more use contracts to the insurance management section 230, in response to the request by the insurance management section 230.

In one embodiment, the vehicle management section 250 manages the position of each of one or more vehicles 120. For example, the vehicle management section 250 sends a vehicle arrangement command, a wait command or a return command to each of one or more vehicles 120, to thereby manage the position of each of one or more vehicles 120.

The vehicle arrangement command may be an instruction for commanding the vehicle 120 or the driver of the vehicle 120 to move to a given position. The vehicle arrangement command may be an instruction for commanding the vehicle 120 or the driver of the vehicle 120 to move to a given position by a given time point.

The wait command may be an instruction for commanding the vehicle 120 or the driver of the vehicle 120 to wait within a given position or area. The wait command may be an instruction for commanding the vehicle 120 or the driver of the vehicle 120 to wait within a given position or area until a given condition is established. As the given condition, a condition that a given time point has come, a condition that the energy or the residual amount of the energy source does not satisfy a given criterion, etc., are exemplified.

The return command may be an instruction for commanding the vehicle 120 or the driver of the vehicle 120 to move to the predefined return location. The return command may be an instruction for commanding the vehicle 120 or the driver of the vehicle 120 to move to the predefined return location by a given time point.

The vehicle management section 250 may acquire information indicating the current position or the movement history of each of one or more vehicles 120 from each of one or more vehicles 120. The information indicating the current position may be the information which the identification information of the vehicle 120, the information indicating the time point, and the information indicating the position of the vehicle 120 at said time point are associated to/from each other. The information indicating the movement history may be the identification information of the vehicle 120 and the information including multiple records related to the position of the vehicle 120. Each record related to the position of the vehicle 120 may be the information which the information indicating the time point and the information indicating the position of the vehicle 120 at said time point are associated to/from each other.

In another embodiment, the vehicle management section 250 manages the status of each of one or more vehicles 120. For example, the vehicle management section 250 acquires information indicating the status of each of one or more vehicles 120 from each of one or more vehicles 120. The vehicle management section 250 may acquire information which the information indicating the time point and the information indicating the status of the vehicle 120 at said time point are associated to/from each other, from each of one or more vehicles 120.

As the status of the vehicle 120, whether or not the vehicle 120 is in the manual driving mode, whether or not the vehicle 120 is in the automatic driving mode, a speed of the vehicle 120, an acceleration of the vehicle 120, an angular speed of the vehicle 120, an angular acceleration of the vehicle 120, an operating state of the vehicle 120 by the driver, a working state of the apparatus mounted to the vehicle 120, a state inside the vehicle 120, a state outside the vehicle 120, and, at least one of presence/absence of emergency notification from the first moving body or the passenger in the first moving body and presence/absence of a rescue demand from the first moving body or the passenger in the first moving body, are exemplified. As the working state of the apparatus mounted to the vehicle 120, a working state of the advanced driver assistance system, a working state of the collision avoidance system, a working state of the automatic braking system, a working state of the automatic steering system, a working state of the air bag and the like are exemplified.

As the state inside the vehicle of the vehicle 120, image data of the images captured by the in-vehicle camera mounted to the vehicle 120, an analysis data of said images and the like are exemplified. The state inside the vehicle 120 may be the voice/sound data recorded by the in-vehicle microphone mounted to the vehicle 120, or the analysis data of said voice/sound. As the state outside the vehicle 120, image data of the images captured by an exterior camera mounted to the vehicle 120, an analysis data of said images and the like are exemplified. The state outside the vehicle of the vehicle 120 may be the voice/sound data recorded by the exterior microphone mounted to the vehicle 120, or the analysis data of said voice/sound.

The request acceptance section 220 may be an example of a user attribute acquisition section. The vehicle management section 250 may be an example of an information processing apparatus.

Figure 3:
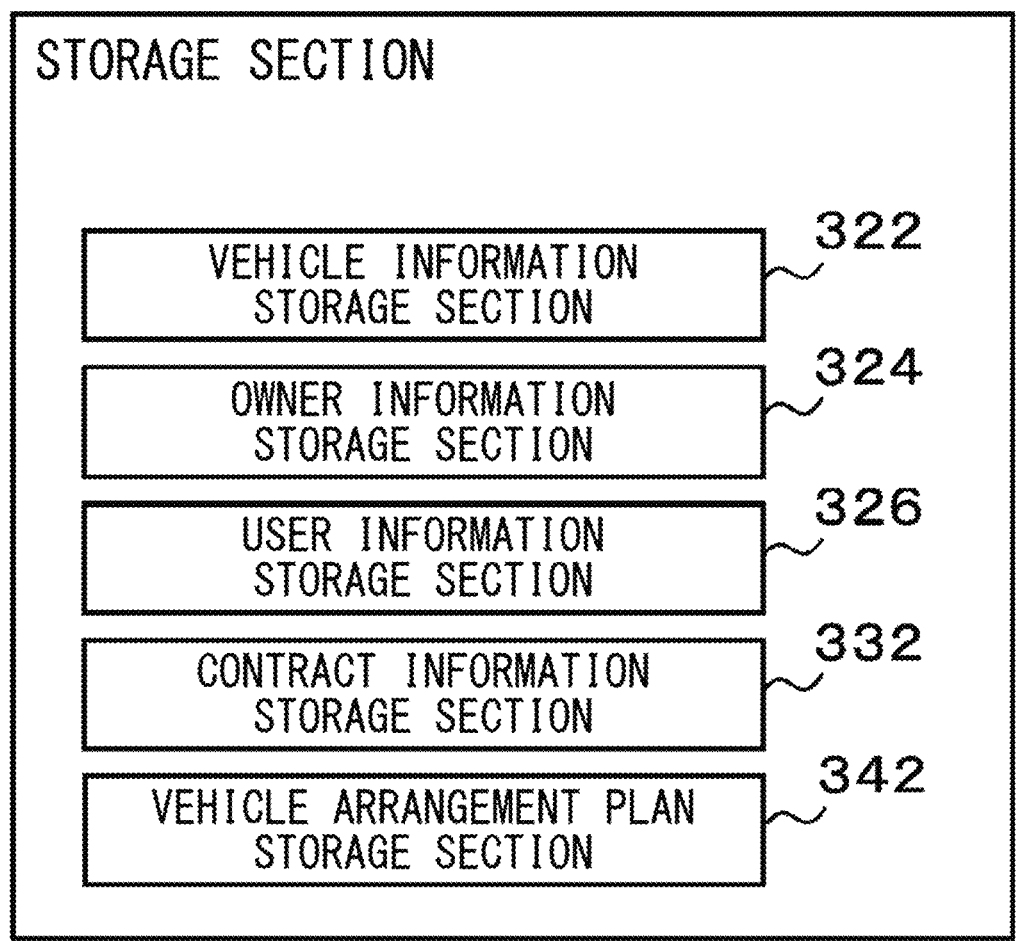
FIG. 3 schematically shows an example of an inner configuration of a storage section 350.

FIG. 3 schematically shows an example of an inner configuration of a storage section 240. In this embodiment, the storage section 240 includes, for example, a vehicle information storage section 322, an owner information storage section 324, a user information storage section 326, a contract information storage section 332, and a vehicle arrangement plan storage section 342.

In this embodiment, the vehicle information storage section 322 stores various kinds of information related to each of one or more vehicles 120 (this is called "vehicle information" in some cases). The vehicle information storage section 322 may store the vehicle information, for each of one or more vehicles 120, associating said vehicle information with the identification information of said vehicle. As the vehicle information, information indicating the position of the vehicle 120, information indicating the status of the vehicle 120, information indicating the attribute of the vehicle 120 and the like are exemplified.

As the attribute of the vehicle 120, at least one of a category of the vehicle 120, a seating capacity of the vehicle 120, a specification of the living space in the vehicle 120, a maximum carriable capacity of the vehicle 120, a specification of the luggage receiving space of the vehicle 120, a category of the installation mounted to the vehicle 120, a specification of the installation mounted to the vehicle 120, an attribute of the item mountable to the vehicle 120, availability/non-availability of smoking in the vehicle 120, and a cleaning status of the vehicle 120, are exemplified. As the category of the vehicle 120, a kind of car or a type, a name of the manufacturer or a name of the vendor, a model name or a title, a year of manufacture and the like are exemplified. As the kind of car or a type, an SUV, a sedan, a bike and the like are exemplified. As the specification of various kinds of spaces, a capacity of said space, a dimension of said space and the like are exemplified.

As the installation mounted to the vehicle 120, an audio apparatus, a visual apparatus, an air-conditioning apparatus, an advanced driver assistance system, a collision avoidance system, an automatic braking system, an automatic steering system, an air bag and the like are exemplified. As the attribute of the item mountable to the vehicle 120, availability/non-availability of boarding a pet animal, availability/non-availability of boarding an infant, availability/non-availability of boarding a child not reaching to a given age or an infant, availability/non-availability of boarding a smoker, availability/non-availability of boarding an item that emits a given level or more of odor, etc., are exemplified.

In this embodiment, the owner information storage section 324 stores various kinds of information related to each of one or more owners 20. The owner information storage section 324 may store the information related to said owner, for each of one or more owners 20, associating said information related to the owner with the identification information related to said owner. As the information related to the owner 20, a name or a title, an address, an account for payment, an account for communication, an attribute, information related to an assessment and the like are exemplified.

In this embodiment, the user information storage section 326 stores various kinds of information related to each of one or more users 40. The user information storage section 326 stores, for each of one or more users 40, the information related to said user with the identification information of said user. As the information related to the user 40, a name or a title, an address, an account for payment, an account for communication, an attribute, information related to an assessment and the like are exemplified.

In this embodiment, the contract information storage section 332 stores the information related to each of one or more contracts. The contract information storage section 332 may store the information related to each of one or more use contracts. The contract information storage section 332 may store the information related to each of one or more insurance contracts. The contract information storage section 332 may store the information indicating the content of each contract, associating said information indicating the content of each contract with the identification information of each contract and the information indicating the category of each contract. The identification information of the contract may be the identification information of the vehicle arrangement request corresponding to said contract. As the category of the contract, a use contract, an insurance contract and the like are exemplified.

As the information indicating the content of a use contract, information indicating at least one of the contracting parties (for example, being the user 40), information indicating the condition related to the fulfillment term of the contract, information indicating the condition related to the position of the vehicle 120 in the fulfillment term of the contract, information indicating the amount of the compensation for use of the vehicle 120, information indicating the payment style of the compensation, etc., are exemplified. As an example of other information indicating the content of a use contract, information indicating permission/prohibition of use in the manual driving mode, information related to the condition under which use in the manual driving mode is permitted, information related to the processing in case of an accident or a failure occurred during the manual driving mode, etc., are exemplified. As the information indicating the content of an insurance contract, information indicating the subscriber (for example, being the user 40), information indicating the content and condition of indemnification, an information indicating the amount of the insurance premium, information indicating the payment style of the insurance premium, etc., are exemplified.

In this embodiment, the vehicle arrangement plan storage section 342 stores information related to at least one vehicle arrangement plan of one or more vehicle 120. The vehicle arrangement plan storage section 342 may, for example, for each of at least one of one or more vehicle 120, store the information indicating the vehicle arrangement plan of said vehicle, associating said vehicle arrangement plan of said vehicle with the identification information of said vehicle. The information indicating the vehicle arrangement plan of the vehicle 120 may include the information indicating the person who uses the vehicle 120, the information indicating the condition related to the vehicle arrangement timing, the information indicating the condition related to the vehicle arrangement position. The vehicle arrangement timing may be the timing at which use of the vehicle 120 will start. The vehicle arrangement position may be the position of the vehicle 120 at the vehicle arrangement timing.

Figure 4:
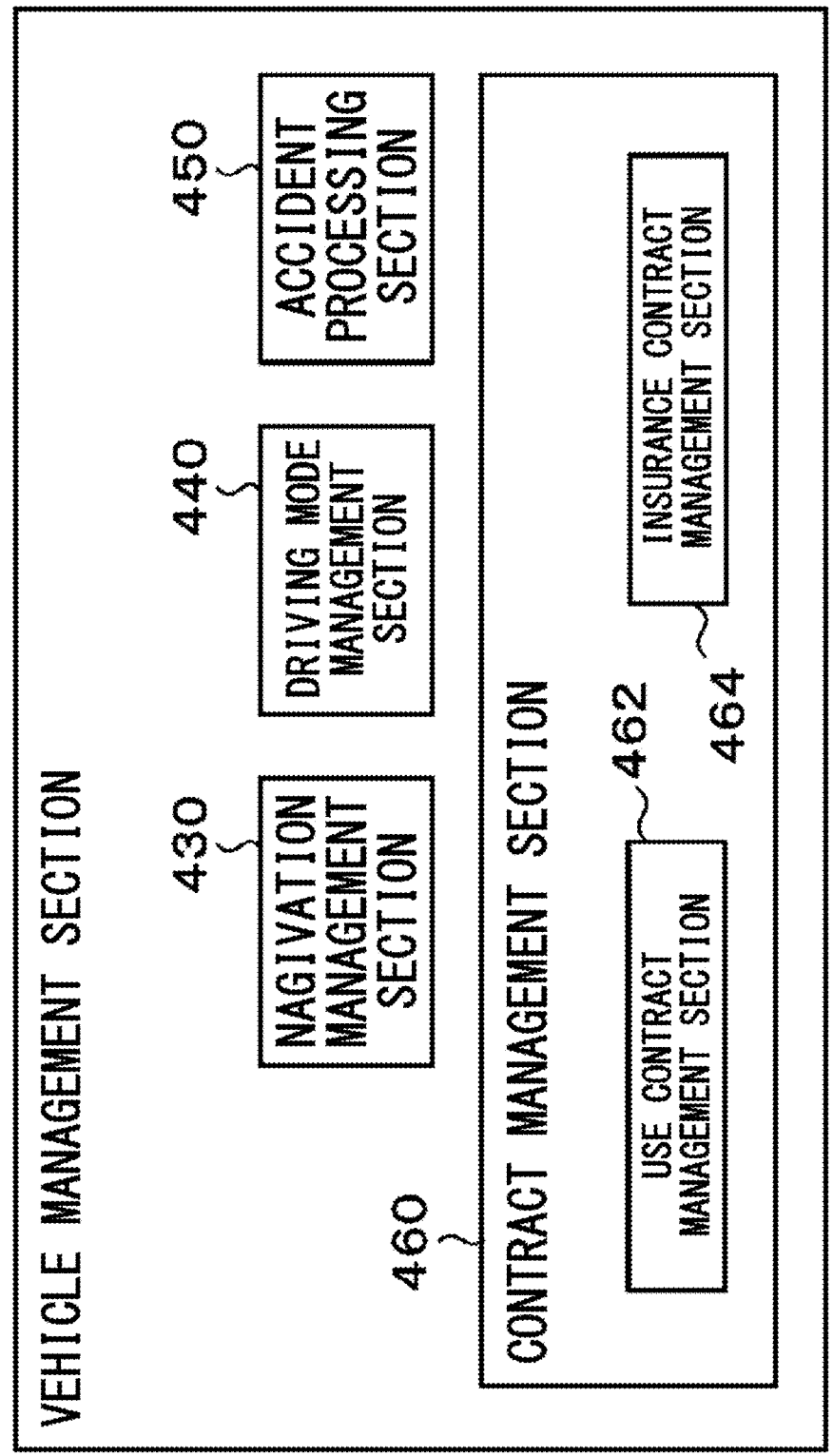
FIG. 4 schematically shows an example of an inner configuration of a vehicle management section 250.

FIG. 4 schematically shows an example of an inner configuration of a vehicle management section 250. In this embodiment, the vehicle management section 250 includes a navigation management section 430, a driving mode management section 440, an accident processing section 450, and a contract management section 460. In this embodiment, the contract management section 460 has a use contract management section 462, and an insurance contract management section 464.

In this embodiment, the navigation management section 430 manages the navigation of each of one or more vehicles 120. For example, the navigation management section 430 manages at least one of the position and the status of each of one or more vehicles 120.

The navigation management section 430 may manage the vehicle arrangement of each of one or more vehicles 120. The navigation management section 430 may detect occurrence of a failure in each of one or more vehicle 120. The navigation management section 430 may detect occurrence of an accident involved with each of one or more vehicle 120.

For example, the navigation management section 430 detects, among one or more vehicles 120, occurrence of an accident involving the vehicle 120 acting in the manual driving mode. The navigation management section 430 may, among the accidents involved with the vehicle 120 acting in the manual driving mode, detect occurrence of an accident between the vehicle 120 acting in the manual driving mode and another vehicle acting in the automatic driving mode. If occurrence of the above-described accident has been detected, the navigation management section 430 may output the information indicating the occurrence of the accident to the accident processing section 450. The navigation management section 430 may output the information indicating the content of the accident to the accident processing section 450.

In this embodiment, the driving mode management section 440 manages at least one driving mode of one or more vehicles 120. In one embodiment, the driving mode management section 440 judges permission/prohibition of switching the driving mode of a given vehicle 120 from the automatic driving mode to the manual driving mode. In another embodiment, the driving mode management section 440 judges permission/prohibition of switching the driving mode of a given vehicle 120 from the manual driving mode to the automatic driving mode. Further in another embodiment, the driving mode management section 440 judges whether or not to forcedly switch the driving mode of a given vehicle 120 from the manual driving mode to the automatic driving mode. The detail of the driving mode management section 440 will be described later.

In this embodiment, the accident processing section 450 acquires, from the navigation management section 430, information indicating that occurrence of an accident involving at least one of the one or more vehicles 120 under management by the management server 110 (this is called "accident detection information" in some cases) was detected. Once the accident processing section 450 acquires the accident detection information, the accident processing section 450 determines the disposition against the user 40 of the vehicle 120 involved in said accident. As the above-described disposition, claiming money, a restriction of utilization of the service provided by the management server 110, lowering of the assessment against the user 40 and the like are exemplified.

In this embodiment, the contract management section 460 manages various kinds of contracts. For example, the contract management section 460 manages establishment of a contract, alteration of the content of the contract, as well as storage and updating the contract information, for each of the use contract and the insurance contract. In this embodiment, the use contract management section 462 manages the use contract related to each of the one or more vehicle 120 under management by the management server 110.

The insurance contract management section 464 manages the insurance contract related to each of the one or more vehicle 120 under management by the management server 110. For example, if alteration of or addition to the insurance contract becomes necessary along with the alteration of the use contract of a given vehicle 120, alteration or addition of the insurance contract is requested to the insurance management section 230. The insurance management section 230 accesses to the insurance contract server 130 based on the request by the insurance contract management section 464, to execute processing for altering the content of the contract of an existing insurance or for subscribing an additional insurance. The insurance management section 230 stores information indicating the execution result of the above-described processing in the storage section 240. Moreover, the insurance management section 230 outputs information indicating that the above-described processing has been completed to the insurance contract management section 464.

The navigation management section 430 may be an example of the accident detection section. The driving mode management section 440 may be an example of the information processing apparatus. The accident processing section 450 may be an example of the disposition determination section.

Figure 5:
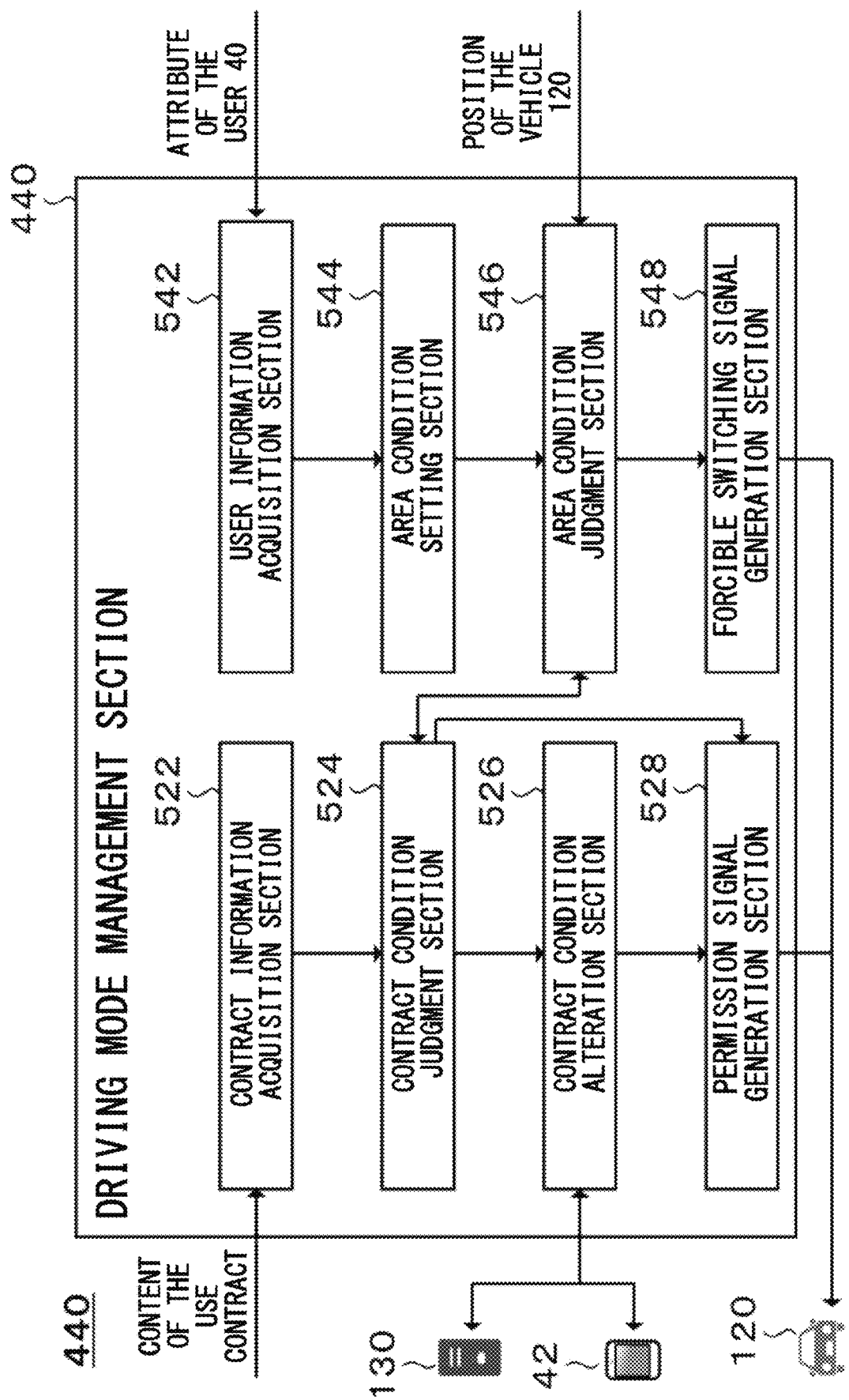
FIG. 5 schematically shows an example of an inner configuration of a driving mode management section 440.

FIG. 5 schematically shows an example of an inner configuration of a driving mode management section 440. In this embodiment, the driving mode management section 440 includes a contract information acquisition section 522, a contract condition judgment section 524, a contract condition alteration section 526, and a permission signal generation section 528. In this embodiment, the driving mode management section 440 includes a user information acquisition section 542, an area condition setting section 544, an area condition judgment section 546, and a forcible switching signal generation section 548.

In this embodiment, the contract information acquisition section 522 acquires the information related to the contract of a given vehicle 120, for example, referring to the contract information storage section 332. For example, the contract information acquisition section 522 acquires the use contract information of a given vehicle 120. The contract information acquisition section 522 may acquire the insurance contract information of a given vehicle 120.

More specifically, the contract information acquisition section 522 acquires the command inputted to the vehicle 120 by the user 40. The above-described command may be a command related to operation of the vehicle 120. For example, the user 40 operates the operation panel of the vehicle 120, or utilizes the voice/sound recognition function of the vehicle 120, to input a switch command for switching the driving mode of the vehicle 120 from the automatic driving mode to the manual driving mode. Once the switch command is inputted to the vehicle 120, the vehicle 120 sends said switch command to the contract information acquisition section 522.

Once the contract information acquisition section 522 receives the above-described switch command from the vehicle 120, the contract information acquisition section 522 acquires the use contract information of the vehicle 120 to which the switch command has been inputted, referring to the contract information storage section 332. The contract information acquisition section 522 outputs the information indicating that the switch command has been inputted to the vehicle 120 and the use contract information of the vehicle 120 to the contract condition judgment section 524.

In this embodiment, the contract condition judgment section 524 judges whether or not the behavior of the user 40 of the vehicle 120 matches with the condition defined by the use contract of the vehicle 120. For example, the user information acquisition section 542 judges whether or not the content of the command from the user 40 matches with the condition defined by the use contract of the vehicle 120.

More specifically, the contract condition judgment section 524 receives the information indicating that a switch command has been inputted to the vehicle 120 and the use contract information of the vehicle 120 from the contract information acquisition section 522. The contract condition judgment section 524 judges permission/prohibition of switching the driving mode indicated by said switch command, based on the use condition of the vehicle 120 indicated by the use contract information.

In one embodiment, if information indicating that manual driving by the user 40 is permitted is included in the use condition, the contract condition judgment section 524 judges that switching of the driving mode indicated by the switch command is permitted. The information indicating that manual driving by the user 40 is permitted may be the information indicating that the user 40 may possibly drive the moving body manually in at least a part of the contract period.

In this case, the contract condition judgment section 524 may send the information indicating that switching to the manual driving mode is permitted to the permission signal generation section 528.

In another embodiment, if the use condition includes information related to the condition under which manual driving by the user 40 is permitted, the contract condition judgment section 524 judges establishment/non-establishment of said condition. For example, if information indicating the area or pathway in which manual driving by the user 40 is permitted, or information indicating the attribute of the area or pathway in which manual driving by the user 40 is permitted, is included as the above-described condition, the contract condition judgment section 524 may request to the area condition judgment section 546 to judge whether or not the current position of the vehicle 120 matches with the above-described condition. The contract condition judgment section 524 may determine establishment/non-establishment of the above-described condition, based on the judgment result of the area condition judgment section 546.

If the above-described condition is established, the contract condition judgment section 524 judges that switching of the driving mode indicated by the switch command is permitted. In this case, the contract condition judgment section 524 may send the information indicating that switching to the manual driving mode is permitted to the permission signal generation section 528.

On the other hand, if the above-described condition is not established, the contract condition judgment section 524 judges that switching of the driving mode indicated by the switch command is not permitted. In this case, the contract condition judgment section 524 may send the information indicating that switching to the manual driving mode is not permitted to the contract condition alteration section 526.

Further in another embodiment, if information indicating that manual driving by the user 40 is permitted is not included in the use condition, or if information indicating that manual driving by the user 40 is not permitted is included in the use condition, the contract condition judgment section 524 judges that switching of the driving mode indicated by the switch command is not permitted. In this case, the contract condition judgment section 524 may send information indicating that switching to the manual driving mode is not permitted to the contract condition alteration section 526.

In this embodiment, the contract condition alteration section 526 receives information indicating that switching to the manual driving mode is not permitted from the contract condition judgment section 524. The contract condition alteration section 526 alters the use contract in order that the condition under which the manual driving by the user 40 is permitted should be satisfied.

Specifically, the contract condition alteration section 526 compares the condition under which the manual driving by the user 40 is permitted with the current use contract, to extract the condition that is deficient under the current use condition among one or more conditions which become necessary so that manual driving by the user 40 is permitted. Next, the contract condition alteration section 526 prepares a draft of the use condition which should satisfy the extracted condition.

The condition under which switching of the driving mode indicated by the switch command is permitted may include information indicating that at least one of the amount of the insurance premium, the commission and the compensation for use of the vehicle 120 increases compared to the case where the user 40 uses the vehicle 120 in the automatic driving mode. The condition under which switching of the driving mode indicated by the switch command is permitted may include the information indicating the area or pathway, or the attribute of the area or pathway in which the user 40 is permitted to use the vehicle 120 in the manual driving mode.

Next, the contract condition alteration section 526 sends the draft of the above-described use condition to the vehicle 120 or the communication terminal 42 of the user 40 to present the draft of the above-described use condition to the user 40. The user 40 sends the information indicating whether or not he/she consents to the draft of the above-described use condition outputted from the output apparatus of the vehicle 120 or the communication terminal 42 to the management server 110. For example, if the user 40 consents to the draft of the above-described use condition, the user 40 sends the information indicating that he/she consents to said draft to the management server 110. On the other hand, if the user 40 does not consent to the draft of the above-described use condition, the user 40 sends the information indicating that he/she does not consent to said draft to the management server 110.

If the contract condition alteration section 526 acquires the information indicating that the user 40 has consented to the above-described use condition from the user 40, the contract condition judgment section 524 sends the information indicating that switching to the manual driving mode is permitted to the permission signal generation section 528. On the other hand, if the contract condition alteration section 526 acquires the information indicating that the user 40 has not consented to the above-described use condition from the user 40, the contract condition judgment section 524 sends the information indicating that switching to the manual driving mode is not permitted to the vehicle 120.

In this embodiment, the permission signal generation section 528 outputs the instruction for causing the vehicle 120 to execute the processing for switching the driving mode of the vehicle 120. The processing for switching the driving mode of the vehicle 120 may be the processing for switching the driving mode of the vehicle 120 from the manual driving mode to the automatic driving mode. The processing for switching the driving mode of the vehicle 120 may be a processing for switching the driving mode of the vehicle 120 from the automatic driving mode to the manual driving mode.

For example, the permission signal generation section 528 receives the information indicating that switching to the manual driving mode is permitted from the contract condition judgment section 524. Once the permission signal generation section 528 receives the information indicating that switching to the manual driving mode is permitted, the permission signal generation section 528 outputs the first instruction for causing the vehicle 120 to execute the first switch processing for switching the driving mode of the vehicle 120 from the automatic driving mode to the manual driving mode.

The permission signal generation section 528 may send the above-described first instruction to the vehicle 120. Upon receiving the first instruction, the vehicle 120 executes the above-described first processing. By this, the driving mode of the vehicle 120 is switched from the automatic driving mode to the manual driving mode.

In this embodiment, the user information acquisition section 542 acquires the user attribute information indicating the attribute of the user 40 who uses a given vehicle 120, referring to the user information storage section 326. The user information acquisition section 542 may output the acquired user attribute information to the area condition setting section 544.

In this embodiment, the area condition setting section 544 acquires the user attribute information of the user 40 who uses a given vehicle 120 from the user information acquisition section 542. The area condition setting section 544 may, based on the attribute of the user 40 indicated by the above-described user attribute information, determine the area or pathway in which the user 40 is permitted to use the vehicle 120 in the manual driving mode, or the attribute of the area or pathway. By this, the management server 110 can, in accordance with the attribute of the user 40, automatically set the condition related to the area or pathway in which the user 40 is permitted to use the vehicle 120 in the manual driving mode.

In this embodiment, the area condition judgment section 546 judges whether or not a given vehicle 120 exists in an area or pathway in which the user 40 is permitted to use the vehicle 120 in the manual driving mode. The area condition judgment section 546 may judge whether or not the area or pathway in which a given vehicle 120 exists matches with the attribute of the area or pathway in which the user 40 is permitted to use the vehicle 120 in the manual driving mode.

More specifically, firstly, the area condition judgment section 546 acquires the information indicating the current position or the movement history of a given vehicle 120. Next, the area condition judgment section 546 judges, based on the current position or the movement history of a given vehicle 120, (i) whether or not the vehicle 120 exists in the area or pathway in which the user 40 is permitted to use the moving body in the manual driving mode, or (ii) whether or not the attribute of the area or pathway in which the vehicle 120 exists matches with the attribute of the area or pathway in which the user 40 is permitted to use the moving body in the manual driving mode. The area condition judgment section 546 may output the information indicating the judgment result to the forcible switching signal generation section 548.

In this embodiment, the forcible switching signal generation section 548 outputs the second instruction for causing the vehicle 120 to execute the second switch processing for switching the driving mode of the vehicle 120 from the manual driving mode to the automatic driving mode, based on the judgment result of the area condition judgment section 546. For example, the forcible switching signal generation section 548 sends the second instruction to the vehicle 120, if (i) the vehicle 120 does not exist in the area or pathway in which the user 40 is permitted to use the moving body in the manual driving mode, or (ii) the attribute of the area or pathway in which the vehicle 120 exists is judged to not match with the attribute of the area or pathway in which the user 40 is permitted to use the moving body in the manual driving mode.

The vehicle 120 executes the above-described second processing, once it receives the second instruction. As a result, the driving mode of the vehicle 120 is switched from the manual driving mode to the automatic driving mode. According to this embodiment, for example, if the vehicle 120 enters into an area or pathway which is not appropriate for use by the user 40 in the manual driving, the driving mode of the vehicle 120 will be automatically switched to the automatic driving mode. By this, the user 40 can use the vehicle 120 more safely.

The contract information acquisition section 522 may be an example of the use condition acquisition section and the switch command acquisition section. The contract condition judgment section 524 may be an example of the switch judgment section. The contract condition alteration section 526 may be an example of the condition presentation section and the consent information acquisition section. The permission signal generation section 528 may be an example of the first instruction output section. The user information acquisition section 542 may be an example of the user attribute acquisition section. The area condition judgment section 546 may be an example of the position information acquisition section and the position judgment section. The forcible switching signal generation section 548 may be an example of the second instruction output section.

Figure 6:
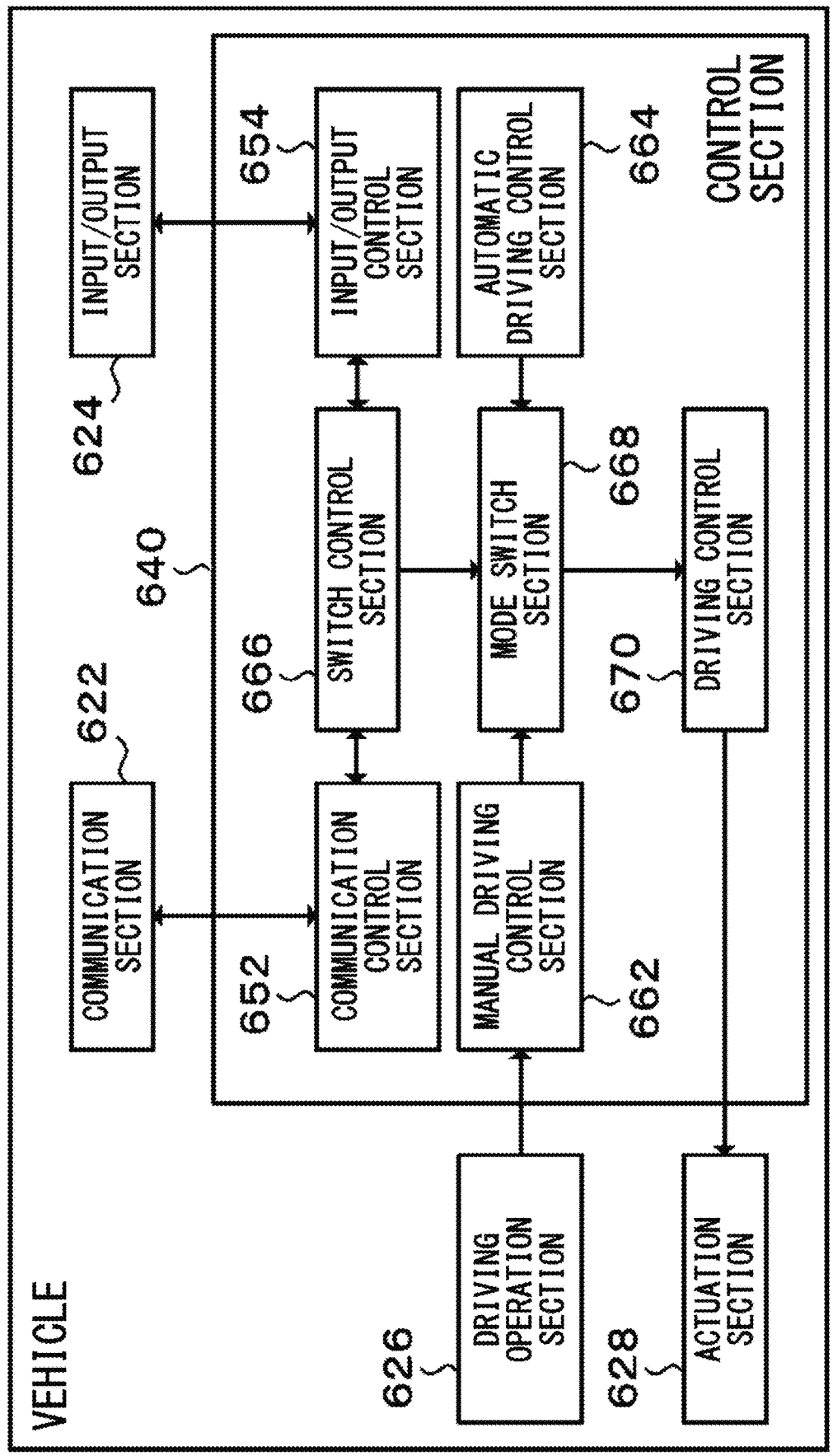
FIG. 6 schematically shows an example of a system configuration of a vehicle 120.

FIG. 6 schematically shows an example of a system configuration of a vehicle 120. In this embodiment, the vehicle 120 includes a communication section 622, an input/output section 624, a driving operation section 626 and an actuation section 628. In this embodiment, the vehicle 120 includes a control section 640. In this embodiment, the control section 640 has a communication control section 652 and an input/output control section 654. In this embodiment, the control section 640 has a manual driving control section 662, an automatic driving control section 664, a switch control section 666, a mode switch section 668, and an actuation control section 670.

In this embodiment, the communication section 622 sends and receives information between the itself and the management server 110 or the user 40. In this embodiment, the input/output section 624 presents information to the user 40, or receives information from the user 40. For example, the input/output section 624 receives a command from the user 40. As the input/output section 624, (i) an information input apparatus such as a keyboard, a touch panel, a pointing device, a camera, a microphone, a voice/sound input system, a gesture input system, and (ii) an information output apparatus such as a display apparatus, a projection apparatus, a speaker, and the like, are exemplified.

In this embodiment, the driving operation section 626 accepts operation input from the user 40. In this embodiment, the actuation section 628 actuates the vehicle 120. In this embodiment, the control section 640 controls action of each portion of the vehicle 120.

In this embodiment, the communication control section 652 controls the action of the communication section 622. In this embodiment, the input/output control section 654 controls the action of the input/output control section 654.

In this embodiment, the manual driving control section 662 outputs information for controlling the actuation of the vehicle 120 in the manual driving mode. In this embodiment, the automatic driving control section 664 outputs information for controlling the actuation of the vehicle 120 in the automatic driving mode.

In this embodiment, the switch control section 666 controls switching of the driving mode of the vehicle 120. Specifically, the switch control section 666 controls the action of the mode switch section 668 to switch between the automatic driving mode and the manual driving mode. In this embodiment, the switch control section 666 executes processing for switching between the automatic driving mode and the manual driving mode, based on the instruction from the driving mode management section 440 of the management server 110. In this embodiment, the mode switch section 668 switches between the automatic driving mode and the manual driving mode, based on the command from the switch control section 666.

In this embodiment, the actuation control section 670 controls the actuation section 628. In this embodiment, if the driving mode of the vehicle 120 is in the manual driving mode, the actuation control section 670 controls the actuation section 628, based on the command from the manual driving control section 662. On the other hand, if the driving mode of the vehicle 120 is in the automatic driving mode, the actuation control section 670 controls the actuation section 628, based on the command from the automatic driving control section 664.

Figure 7:
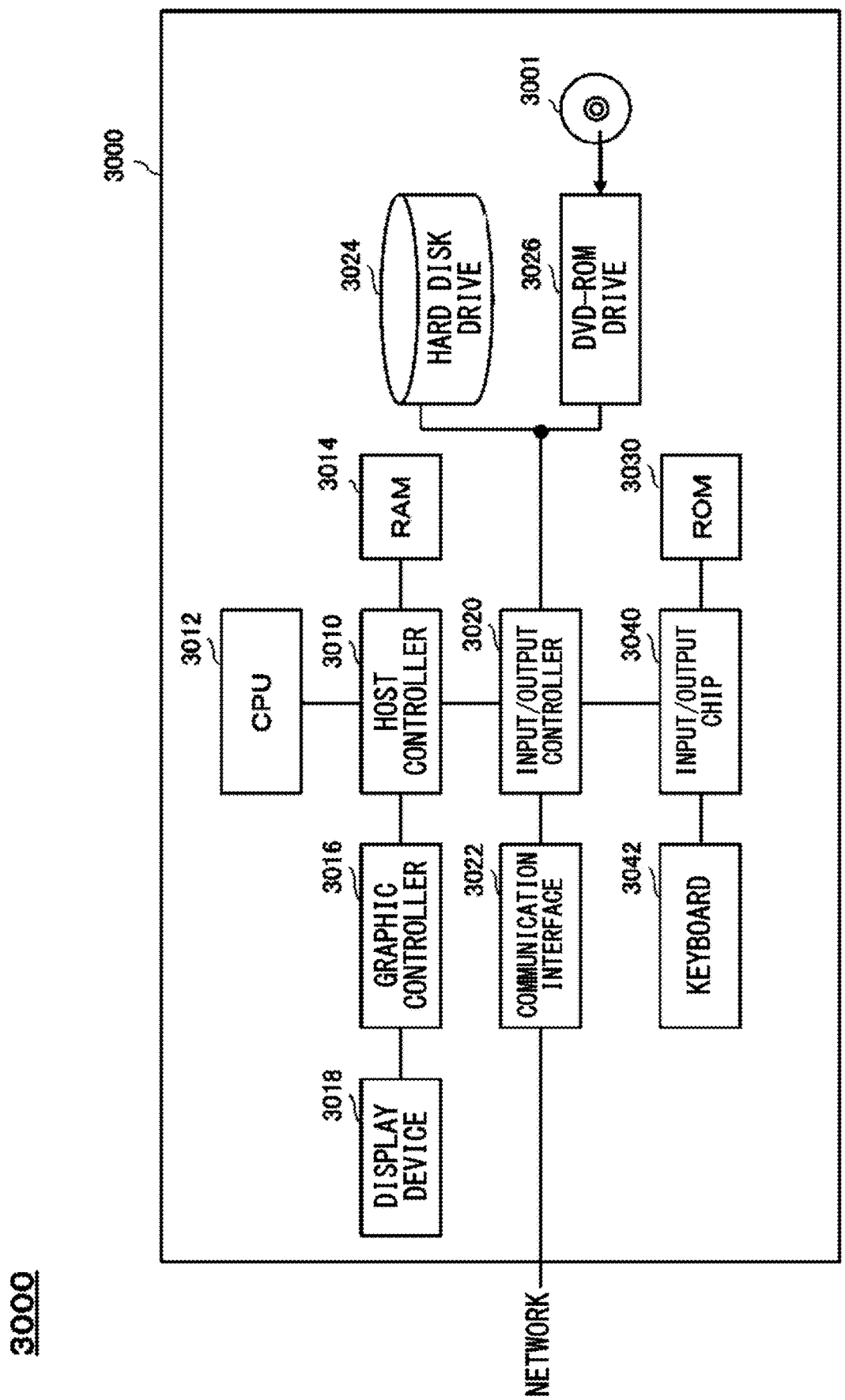
FIG. 7 schematically shows an example of a system configuration of a computer 3000.

FIG. 7 shows an example of a computer 3000, in which multiple aspects of this invention may be entirely or partially embodied. The management system 100 or a part thereof may be realized by the computer 3000. For example, the management system 100 or a part thereof is realized by the computer 3000. The vehicle 120 or a part thereof may be realized by the computer 3000. For example, the control section 640 or a part thereof of the vehicle 120 is realized by the computer 3000.

The program installed in the computer 3000 can cause the computer 3000 to function as an operation associated with an apparatus according to the embodiment of the present invention or as one or more "section" of said apparatus, or can cause it to execute said operation or said one or more "section", and/or cause the computer 3000 to execute a process according to the embodiment of the present invention or the step of said process. Such program may be executed by the CPU 3012, so as to cause the computer 3000 to execute a given operation associated with some or all of the flowcharts and the blocks of the block diagrams described in this specification.

The computer 3000 according to this embodiment includes a CPU 3012, a RAM 3014, a graphic controller 3016 and a display device 3018, and is mutually connected to by means of a host controller 3010. The computer 3000 further includes the communication interface 3022, the hard disk drive 3024, the DVD-ROM drive 3026 and the input/output unit such as an IC card drive, and they are connected to the host controller 3010 via the input/output controller 3020. The computer also includes a legacy input/output units such as a ROM 3030 and a keyboard 3042, and they are connected to the input/output controller 3020 via an input/output chip 3040.

The CPU 3012 acts pursuant to the program stored in the ROM 3030 and the RAM 3014, and controls respective units by them. The graphic controller 3016 acquires image data generated by the CPU 3012 on a frame buffer or the like provided in the RAM 3014 or in itself, and causes the image data to be displayed on the display device 3018.

The communication interface 3022 communicates with other electronic devices via the network. The hard disk drive 3024 stores the program and data to be used by the CPU 3012 in the computer 3000. The DVD-ROM drive 3026 reads a program or data from the DVD-ROM 3001, and provides the program or data to the hard disk drive 3024 via the RAM 3014. The IC card drive reads the program and data from the IC card, and/or writes the program and data to the IC card.

The ROM 3030 stores a boot program, etc. executed by the computer 3000 at the time of activation, and/or a program dependent on the hardware of the computer 3000. The input/output chip 3040 may also connect various input/output units to the input/output controller 3020, via a parallel port, a serial port, a keyboard port, a mouse port, etc.

A program is provided by a computer-readable storage medium like the DVD-ROM 3001 or the IC card. A program is read from the computer-readable storage medium, and installed in the hard disk drive 3024, the RAM 3014 or the ROM 3030, which are the examples of computer-readable storage media, and then executed by the CPU 3012. Information processing described in these programs are read by the computer 3000, and results in codriving between the program and the above-described various types of hardware resources. An apparatus or method may be configured by realizing an operation or processing of information pursuant to the use of the computer 3000.

For example, if a communication is executed between the computer 3000 and an external device, the CPU 3012 may execute the communication program loaded on the RAM 3014 to instruct communication processing, based on the processing described in the communication program, to the communication interface 3022. The communication interface 3022 reads, under the control by the CPU 3012, the transmission data stored in the transmission buffer region provided in a recording medium such as a RAM 3014, a hard disk drive 3024, a DVD-ROM 3001 or an IC card, sends the transmission data so read to the network, or writes the received data received from the network into a reception buffer region etc. provided on the recording medium.

Also, the CPU 3012 may cause all or the necessary portion of a file or a database stored in an external recording medium such as a hard disk drive 3024, a DVD-ROM drive 3026 (DVD-ROM 3001), or an IC card be able to be read by the RAM 3014, to accordingly execute various types of processing to the data on the RAM 3014. Next, the CPU 3012 may write back the processed data into an external recording medium.

Various types of programs, data, table and various types of information such as a database may be stored in a recording medium to receive information processing. The CPU 3012 may execute, against the data read from the RAM 3014, various types of processing, including various types of operations specified by an instruction sequence of a program, which are described throughout this disclosure, an information processing, a condition judgment, a conditional branch, an unconditional branch, information search/replacement, etc., and write back the result to the RAM 3014. Moreover, the CPU 3012 may search information in a file in a recording medium, in a database, etc. For example, if multiple entries, each having an attribute value of a first attribute associated with an attribute value of a second attribute, are stored in the recording medium, the CPU 3012 may search an entry coinciding with the condition in which the attribute value of the first attribute is specified from among said multiple entries, read the attribute value of the second attribute stored in said entry, and thereby acquire the attribute value of the second attribute associated with the first attribute which satisfies the predefined condition.

A program or a software module explained above may be stored in a computer 3000 or in a computer-readable storage medium in proximity to the computer 3000. Furthermore, a recording medium such as a hard disk or a RAM provided within a server system connected to a dedicated communication network or the Internet can be used as a computer-readable storage medium, to thereby provide the above-described program to the computer 3000 via the network.

While the embodiments of the present invention have been described, the technical scope of the invention is not limited to the above-described embodiments. It is apparent to persons skilled in the art that various alterations and improvements can be added to the above-described embodiments. Also, to the extent not being technically inconsistent, matters explained about a given embodiment can be applied to other embodiments. Moreover, each component may have features similar to those of other components which have the same name and have the different numerals. It is also apparent from the scope of the claims that the embodiments added with such alterations or improvements can be included in the technical scope of the invention.

The actions, procedures, steps, and stages of each process performed by an apparatus, system, program, and method shown in the claims, embodiments, or diagrams can be realized in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES 10 communication network, 20 owner, 22 communication terminal, 40 user, 42 communication terminal, 100 management system, 110 management server, 120 vehicle, 130 insurance contract server, 132 contract section, 134 storage section, 220 request acceptance section, 230 insurance management section, 240 storage section, 250 vehicle management section, 322 vehicle information storage section, 324 owner information storage section, 326 user information storage section, 332 contract information storage section, 342 vehicle arrangement plan storage section, 350 storage section, 430 navigation management section, 440 driving mode management section, 450 accident processing section, 460 contract management section, 462 use contract management section, 464 insurance contract management section, 522 contract information acquisition section, 524 contract condition judgment section, 526 contract condition alteration section, 528 permission signal generation section, 542 user information acquisition section, 544 area condition setting section 546 area condition judgment section, 548 forcible switching signal generation section, 622 communication section, 624 input/output section, 626 driving operation section, 628 actuation section, 640 control section, 652 communication control section, 654 input/output control section, 662 manual driving control section, 664 automatic driving control section, 666 switch control section, 668 mode switch section, 670 actuation control section, 3000 computer, 3001 DVD-ROM, 3010 host controller, 3012 CPU, 3014 RAM, 3016 graphic controller, 3018 display device, 3020 input/output controller, 3022 communication interface, 3024 hard disk drive, 3026 DVD-ROM drive, 3030 ROM, 3040 input/output chip, 3042 keyboard

What is claimed is:

1. An information processing apparatus for managing or controlling a moving body used by a user based on a predetermined use condition, wherein:
   the moving body is configured to be switchable between an automatic driving mode and a manual driving mode,
   the information processing apparatus comprises:
   at least one processor;
   a use condition acquisition section for acquiring information related to the use condition of the moving body, using the at least one processor,
   a switch command acquisition section for acquiring a switch command for switching a driving mode of the moving body, using the at least one processor, and
   a switch judgment section for judging permission/prohibition of switching of the driving mode indicated by the switch command, based on the use condition of the moving body, using the at least one processor, wherein
   the information related to the use condition includes information that indicates a content of a use contract defining a condition related to a use of the moving body by the user, the use contract concluded by the user, and
   the switch judgment section judges the permission/prohibition of switching of the driving mode indicated by the switch command, based on the condition defined by the use contract.

2. The information processing apparatus according to claim 1, further comprising:
   a first instruction output section for outputting a first instruction for causing the moving body to execute a first switch processing for switching a driving mode of the moving body, using the at least one processor, when the switch judgment section judges that switching of the driving mode indicated by the switch command is permitted.

3. The information processing apparatus according to claim 2, configured to present to the user a condition for switching of the driving mode indicated by the switch command to be permitted to a communication terminal utilized by the moving body or the user, when the switch judgment section judges that switching of the driving mode indicated by the switch command is not permitted.

4. The information processing apparatus according to claim 3, further comprising a consent information acquisition section for acquiring consent information indicating that the user has given a consent to the condition for the driving mode to be permitted to be switched, using the at least one processor, wherein,
   the first instruction output section outputs the first instruction, when the consent information acquisition section has acquired the consent information.

5. The information processing apparatus according to claim 1, configured to present to the user a condition for switching of the driving mode indicated by the switch command to be permitted to a communication terminal utilized by the moving body or the user, when the switch judgment section judges that switching of the driving mode indicated by the switch command is not permitted.

6. The information processing apparatus according to claim 5, further comprising:
   a consent information acquisition section for acquiring consent information indicating that the user has given a consent to the condition for switching of the driving mode to be permitted, using the at least one processor, and
   an instruction output section for outputting a first instruction for causing the moving body to execute a first switch processing for switching the driving mode of the moving body, using the at least one processor.

7. The information processing apparatus according to claim 3, wherein:
   a condition for switching of the driving mode indicated by the switch command to be permitted includes information indicating that at least one of the amount of an insurance premium, a commission and a compensation for use of the moving body increases, compared to a case where the user uses the moving body in the automatic driving mode.

8. The information processing apparatus according to claim 4, wherein:
   a condition for switching of the driving mode indicated by the switch command to be permitted includes an information indicating that at least one of the amount of an insurance premium, a commission and a compensation for use of the moving body increases, compared to a case where the user uses the moving body in the automatic driving mode.

9. The information processing apparatus according to claim 3, wherein:

a condition for switching of the driving mode indicated by the switch command to be permitted includes information indicating an area or a pathway for which the user is permitted to use the moving body in the manual driving mode or an attribute of the area or the pathway.

10. The information processing apparatus according to claim 4, wherein:
a condition for switching of the driving mode indicated by the switch command to be permitted includes an information indicating an area or a pathway for which the user is permitted to use the moving body in the manual driving mode or an attribute of the area or the pathway.

11. The information processing apparatus according to claim 9, further comprising a user attribute acquisition section for acquiring user attribute information indicating an attribute of the user, using the at least one processor, wherein:
the information processing apparatus is configured to determine the area or the pathway for which the user is permitted to use the moving body in the manual driving mode or the attribute of the area or the pathway, based on the attribute of the user indicated by the user attribute information.

12. The information processing apparatus according to claim 9, further comprising:
a position information acquisition section for acquiring information indicating a current position or movement history of the moving body, using the at least one processor,
a position judgment section for judging, based on the information acquired by the position information acquisition section: (i) whether or not the moving body exists in the area or the pathway for which the user is permitted to use the moving body in the manual driving mode, or (ii) whether or not an attribute of an area or a pathway in which the moving body exists matches with the attribute of the area or the pathway for which the user is permitted to use the moving body in the manual driving mode, using the at least one processor, and
a second instruction output section for outputting a second instruction for causing the moving body to execute a second switch processing for switching the driving mode of the moving body from the manual driving mode to the automatic driving mode, when judged that: (i) the moving body does not exist in the area or the pathway for which the user is permitted to use the moving body in the manual driving mode, or (ii) an attribute of an area or a pathway in which the moving body exists does not match with the attribute of the area or the pathway for which the user is permitted to use the moving body in the manual driving mode, using the at least one processor.

13. The information processing apparatus according to claim 1, further comprising:
an accident detection section for detecting occurrence of an accident between the moving body acting in the manual driving mode and another moving body acting in an automatic driving mode, using the at least one processor, and
a disposition determination section for determining a disposition for the user when the accident detection section detects the occurrence of the accident, using the at least one processor.

14. The information processing apparatus according to claim 1, wherein:

the switch judgment section judges that switching of the driving mode indicated by the switch command is permitted, when information indicating that manual driving by the user is permitted is included in the use condition.

15. The information processing apparatus according to claim 14, wherein:
information indicating that manual driving by the user is permitted includes information indicating that the user may possibly manually drive the moving body, at least partially in a use period of the moving body.

16. The information processing apparatus according to claim 1, wherein:
the switch command is a command for switching a driving mode of the moving body from the automatic driving mode to the manual driving mode.

17. The information processing apparatus according to claim 1, wherein:
the moving body is configured to be switchable between an automatic driving mode and a manual driving mode, based on a command by the user.

18. A moving body, comprising:
an information processing apparatus according to claim 1.

19. A non-transitory computer-readable storage medium, storing:
a program for causing a computer to function as an information processing apparatus for managing or controlling a moving body used by a user, based on a predetermined use condition,
wherein the moving body is configured to be switchable between an automatic driving mode and a manual driving mode,
the information processing apparatus comprising:
at least one processor;
a use condition acquisition section for acquiring information related to the use condition of the moving body, using the at least one processor,
a switch command acquisition section for acquiring a switch command for switching a driving mode of the moving body, using the at least one processor, and
a switch judgment section for judging permission/prohibition of switching of the driving mode indicated by the switch command, based on the use condition of the moving body, using the at least one processor, wherein
the information related to the use condition includes information that indicates a content of a use contract defining a condition related to a use of the moving body by the user, the use contract concluded by the user, and
the switch judgment section judges the permission/prohibition of switching of the driving mode indicated by the switch command, based on the condition defined by the use contract.

20. A method for managing or controlling a moving body used by a user, based on a predetermined use condition, wherein:
the moving body is configured to be switchable between an automatic driving mode and a manual driving mode,
the method comprising:
acquiring a use condition, for acquiring information related to the use condition of the moving body,
acquiring switch command, for acquiring a switch command for switching a driving mode of the moving body, and
judging permission/prohibition of switching of the driving mode indicated by the switch command, based on the use condition of the moving body, wherein the information related to the use condition includes information that indicates a content of a use contract defining a condition related to a use of the moving body by the user, the use contract concluded by the user, and the judging includes judging the permission/prohibition of switching of the driving mode indicated by the switch command, based on the condition defined by the use contract.

21. The information processing apparatus according to claim 1, wherein the information that indicates the content of the use contract includes information indicating permission/prohibition of use in the manual driving mode.

22. The information processing apparatus according to claim 1, further comprising a contract condition alteration section for altering the use contract in order that a condition under which a manual driving by the user is permitted can be satisfied, when the switch judgment section judges that switching from the automatic driving mode to the manual driving mode is not permitted.

* * * * *